United States Patent [19]
Pelle

[11] Patent Number: 4,831,231
[45] Date of Patent: May 16, 1989

[54] END EFFECTOR FOR ROBOTIC CUTTING DEVICE

[75] Inventor: Camille Pelle, Pikeville, N.C.

[73] Assignee: AP Parts Manufacturing Company, Toledo, Ohio

[21] Appl. No.: 164,079

[22] Filed: Mar. 4, 1988

[51] Int. Cl.⁴ .............................................. B23K 9/00
[52] U.S. Cl. ........................ 219/121.39; 219/121.48; 219/121.56; 219/121.28; 901/14; 901/42
[58] Field of Search .................. 219/121.39, 121.45, 219/121.48, 121.56, 121.28, 121.3; 901/2, 14, 18, 41, 42

[56] References Cited
U.S. PATENT DOCUMENTS

| | | | |
|---|---|---|---|
| 3,850,307 | 11/1974 | Motoda | 901/14 |
| 3,913,820 | 10/1975 | Valentine | 901/14 |
| 4,205,939 | 6/1980 | Reyes | 901/14 |
| 4,349,182 | 9/1982 | Blackburn | 901/14 |

FOREIGN PATENT DOCUMENTS 1278201 12/1986 U.S.S.R. ................................. 901/14

Primary Examiner—M. H. Paschall
Attorney, Agent, or Firm—Anthony J. Casella; Gerald E. Hespos

[57] ABSTRACT

An end effector for a robotic device is provided. The end effector is operative to follow the shape of a workpiece, despite variations of the workpiece from a specified configuration. The end effector comprises a connecting arm which is pivotally mounted relative to the robotic device. Spring assemblies urge the connecting arm toward a neutral position relative to the robotic device. A forearm is pivotally connected to the connecting arm and includes followers for following the actual shape of the workpiece. A spring is operative to urge the forearm rotationally toward the workpiece, while a piston and cylinder assembly is operative to selectively rotate the forearm against the forces exerted by the spring. A machining tool may be connected to the forearm to perform a selected machining operation on the workpiece.

18 Claims, 3 Drawing Sheets

END EFFECTOR FOR ROBOTIC CUTTING DEVICE

BACKGROUND OF THE INVENTION

Vehicular exhaust systems comprise a complex circuitous array of pipes which carry the heated exhaust gases from the engine to a location where the exhaust gases may safely and conveniently be emitted. Typically, the engine is near the front of the vehicle and the exhaust system terminates near the rear of the vehicle. As a result, the array of pipes comprising the exhaust system must weave its way past other vehicular components. The limited space available both in the engine compartment and under the vehicle necessarily brings the array of exhaust system pipes into very close proximity to other parts of the vehicle, including various electrical components, fluid carrying tubes, the passenger compartment and such.

Government agencies have imposed emissions standards on automobile manufacturers in an attempt to achieve cleaner air. Automobile manufacturers have determined that the levels of certain objectionable components of exhaust gas emissions can be reduced by effecting more complete combustion of the fuels. However, this more complete combustion significantly elevates the temperatures of the exhaust gases directed through the exhaust system of the vehicle. These elevated temperatures can create safety problems or cause structural damage to components of the vehicle near the exhaust system. Consequently, it is necessary to spare and/or insulate at least portions of the heated exhaust system from selected other parts of the vehicle.

Air gap pipes are one extremely effective means for controlling the dissipation of heat from tubular exhaust system components. In particular, the air gap pipe comprises an inner pipe for carrying exhaust gases, and an outer pipe generally concentric with the inner pipe but spaced radially therefrom. The air gap between the inner and outer pipe provides an effective heat insulation and prevents direct contact with the very hot inner pipe. Frequently, the air gap pipe will follow the circuitous non-linear alignment required for the exhaust system as the system extends through the engine compartment and toward the rear of the vehicle.

The prior art has included many methods for manufacturing air gap pipes. The most typical method has included the bending of both the inner and outer pipes into substantially identical non-linear configurations. The outer pipe was then manually fed through a ban saw or the like to cut the outer pipe longitudinally in half. The inner pipe was then disposed between the severed longitudinal halves of the outer pipe, and the outer pipe halves were then rewelded to one another to define an air gap pipe.

Another prior art manufacturing method for creating an air gap pipe has required the placement of a linear outer pipe over a linear inner pipe. The air gap between was then filled with a material having a lower melting point than the metal of either pipe. The inner and outer pipes with the filler therebetween would then be bent into the required circuitous configuration. The assembly of bent pipes would then be heated to a sufficient temperature to enable the filler material to be melted and poured from the gap between the inner and outer pipes. Once again, this manufacturing process was extremely time-consuming and costly.

The prior art has also attempted to employ complex systems of stamp formed heat shields to effectively create an air gap pipe. Heat shield systems such as these are shown in U.S. Pat. No. 3,863,445 which issued to Heath on Feb. 4, 1975.

Particularly effective methods for manufacturing an air gap pipe are shown in U.S. Pat. No. 4,501,302 and U.S. Pat. No. 4,619,292 both of which issued to Jon W. Harwood, and in U.S. Pat. No. 4,656,713 which issued to Bruno A. Rosa, et al. These prior art patents are assigned to the assignee of the subject invention, and the disclosures of these patents are incorporated herein by reference. The methods disclosed in the three previously recited patents involved bending the inner and outer pipes into substantially identical configurations. Supporting means, such as inwardly directed dimples on the outer pipe, are then formed, and the outer pipe is cut longitudinally in half by a preprogrammed robotic cutting apparatus. The outer pipe halves then are clamped around the inner pipe, and the two outer pipe halves are welded together.

Robotic machining and cutting devices are known to follow extremely precise preprogrammed instructions. However, it has been found that metallurgical differences between respective pipes will cause each outer pipe to respond differently to the bending apparatus. As a result, the shape of the pipe presented to the robotic cutting apparatus described in the three previously described patents may vary from the specified shape. Although the variations may be within the limits acceptable for installation of the exhaust system on the vehicle, these variations could result in the robotic cutting device being directed to a significantly off-center location. To account for these possible variations, the system described in U.S. Pat. No. 4,656,713 includes a robotic end effector which is uniquely adapted to follow the actual bent shape of the pipe rather than the specified shape. This is achieved by linear biasing means disposed at angles to one another and operative to follow the actual shape of the pipe. Thus, the end effector will ensure that the circuitously bent outer pipe will be cut substantially precisely longitudinally in half despite significant variations of the bent pipe from its specified configuration. The end effector disclosed in U.S. Pat. No. 4,656,713 is also the subject of a Divisional Application pending an Application Ser. No. 016,648 which was filed on Feb. 19, 1987.

The inventions disclosed in the above described patents and applications have made air gap pipes be an economically feasible option for many complex exhaust system components where temperature levels and heat dissipation are critical. In many of these systems, the space available for the exhaust system components is extremely small, and the exhaust system will pass in very close proximity to other parts of the vehicle. This will often require very sharp bends in the exhaust system components. Additionally, it will often be necessary to cut windows in the outer pipe to bring the exhaust system closer to a structural member that can withstand the higher temperatures of the inner pipe or to provide a vent for dissipating the heated gas within the air gap. In still other situations, a window in an outer pipe will be required to provide room for other structures such as mounting brackets or probes to assess the combustion process. Although the end effector disclosed in U.S. Pat. No. 4,656,713 and in copending Application Ser. No. 016,648 is capable of making the longitudinal cuts along the sharply bent pipes and cutting the above described windows, it is desirable to provide an end effector that can make these complex cuts more efficiently despite variations in the shape of the pipe from its specified shape.

In view of the above, it is an object of the subject invention to provide an end effector to enable complex machining operations in longitudinal members despite variations from one such member to the next.

It is a further object of the subject invention to provide an end effector to enable efficient machining operations on longitudinal members despite geometric and positional variations of the longitudinal members relative to a plurality of different axes.

A further object of the subject invention is to provide a robotic apparatus for making at least longitudinal and circumferential cuts at precise locations in a tubular member that is subject to variance from a specified configuration.

Still a further object of the subject invention is to provide a robotic cutting apparatus for efficiently placing complex non-linear cuts in a tubular member.

SUMMARY OF THE INVENTION

The subject invention is directed to an end effector for a robotic device. The end effector comprises a mounting means for mounting the entire effector to a robotic device such that the end effector is operative to move with the robotic device. In addition, the end effector is operative to move independent of the robotic device to perform machining functions on a workpiece as explained herein. The end effector of the subject invention is particularly well suited to perform work on workpieces that may vary from a specified configuration. For example, the end effector is well suited to perform machining operations on bent cylindrical or tubular workpieces that may not precisely conform to a specified bent configuration.

The end effector of the subject invention comprises a forearm that is pivotable relative to the robotic device. The forearm may comprise means for mounting an appropriate tool thereto. For example, a plasma arc or laser cutting tool may be secured to the forearm of the end effector. The end of the forearm most distant from the robotic device comprises follower means for following the actual configuration of the workpiece and for ensuring that a tool mounted to the forearm is disposed in a proper position relative to the workpiece. For example, the follower means may comprise at least one roller which may roll along a surface of the workpiece. Specifically, the follower means may comprise a pair of rollers angularly offset from one another to accurately position the tool mounted to the forearm at a proper position relative to the workpiece.

The forearm of the end effector further comprises forearm biasing means for rotationally biasing the forearm through its range of pivoting movement toward the workpiece. The forearm biasing means may comprise a spring connectable to a portion of the forearm. In particular, the forearm biasing means may comprise a cable extending from a spring to a location on the forearm spaced from its pivot point. The forearm biasing means is operative to urge the working end of the forearm toward the workpiece despite variations in the actual shape of the workpiece.

The end effector also comprises means for selectively pivoting the forearm in a direction away from the workpiece against the action of the forearm biasing means. The means for pivoting the forearm may comprise a piston and cylinder assembly which is mounted to the robotic device or to a portion of the end effector spaced from the forearm. The piston of the piston cylinder assembly may further comprise a cable or the like extending therefrom to a second location spaced from the pivot point. Cables extending respectively from the forearm biasing means and from the piston may be disposed such that the piston and the biasing means exert opposite rotational forces on the forearm.

The end effector of the subject invention may further comprise a connecting arm extending between the forearm and the robotic device. The connecting arm may be pivotable relative to the robotic device and independent of the forearm. Furthermore, the connecting arm may comprise spring means which permits the connecting arm to pivot relative to the robotic device in response to variations of the workpiece from the specified configuration. Preferably, the spring means for the connecting arm is operative to return the connecting arm to a neutral position relative to the robotic device. The connecting arm and the robotic device may further comprise indicator means to ensure that the spring means of the connecting arm is functioning properly and to check for patterns of variations in the bent shape of the pipe.

In operation, the robotic device may be programmed to exert a specified preload against the workpiece. This may be accomplished by programming which directs the end effector toward an extreme of possible pipe variations. In response to this programming, the connecting arm and the forearm each will rotate a predetermined amount away from all anticipated configurations of the workpiece, including the specified configuration of the workpiece. However, the spring means and the forearm biasing means will ensure that the working end of the end effector is urged rotationally toward and remains continuously in contact with the workpiece as the magnitude and direction of deviation varies from the specified shape.

The spring means between the connecting arm and the robotic device and the forearm biasing means between the connecting arm and the forearm enable the end effector to efficiently follow the actual configuration of the workpiece despite variations that may extend through a plurality of different planes. Furthermore, the piston and cylinder assembly enables controlled movement between the forearm and connecting arm to more accurately perform complex maneuvers on a workpiece. These complex maneuvers can be precisely and accurately carried out at the specified location on the workpiece despite variations of certain workpieces from the specified configuration.

DETAILED DESCRIPTION OF THE PREFERRED EMBODIMENT

Figure 1:
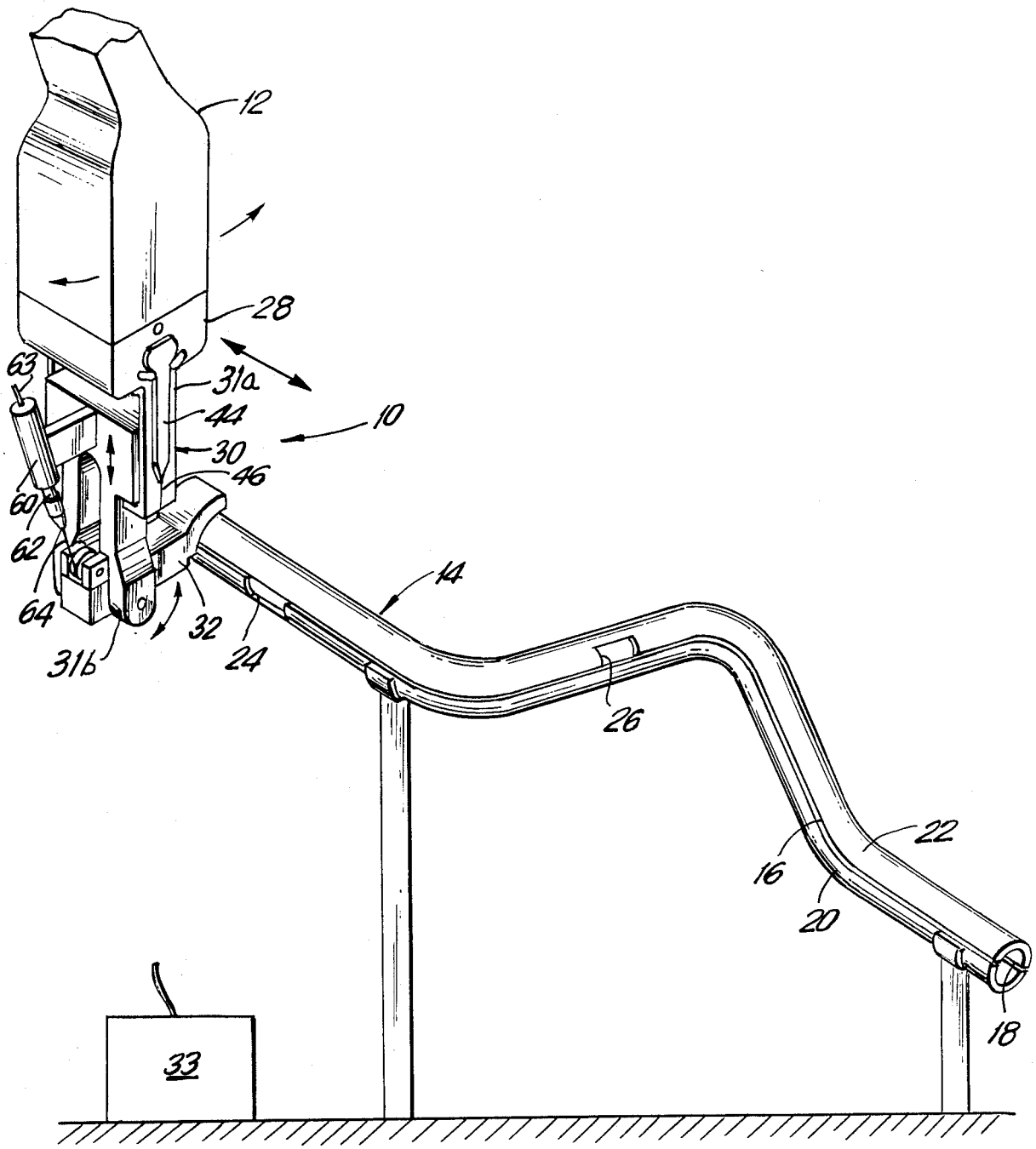
FIG. 1 is a perspective view of the robotic device of the subject invention performing work on a tubular workpiece.
Figure 2:
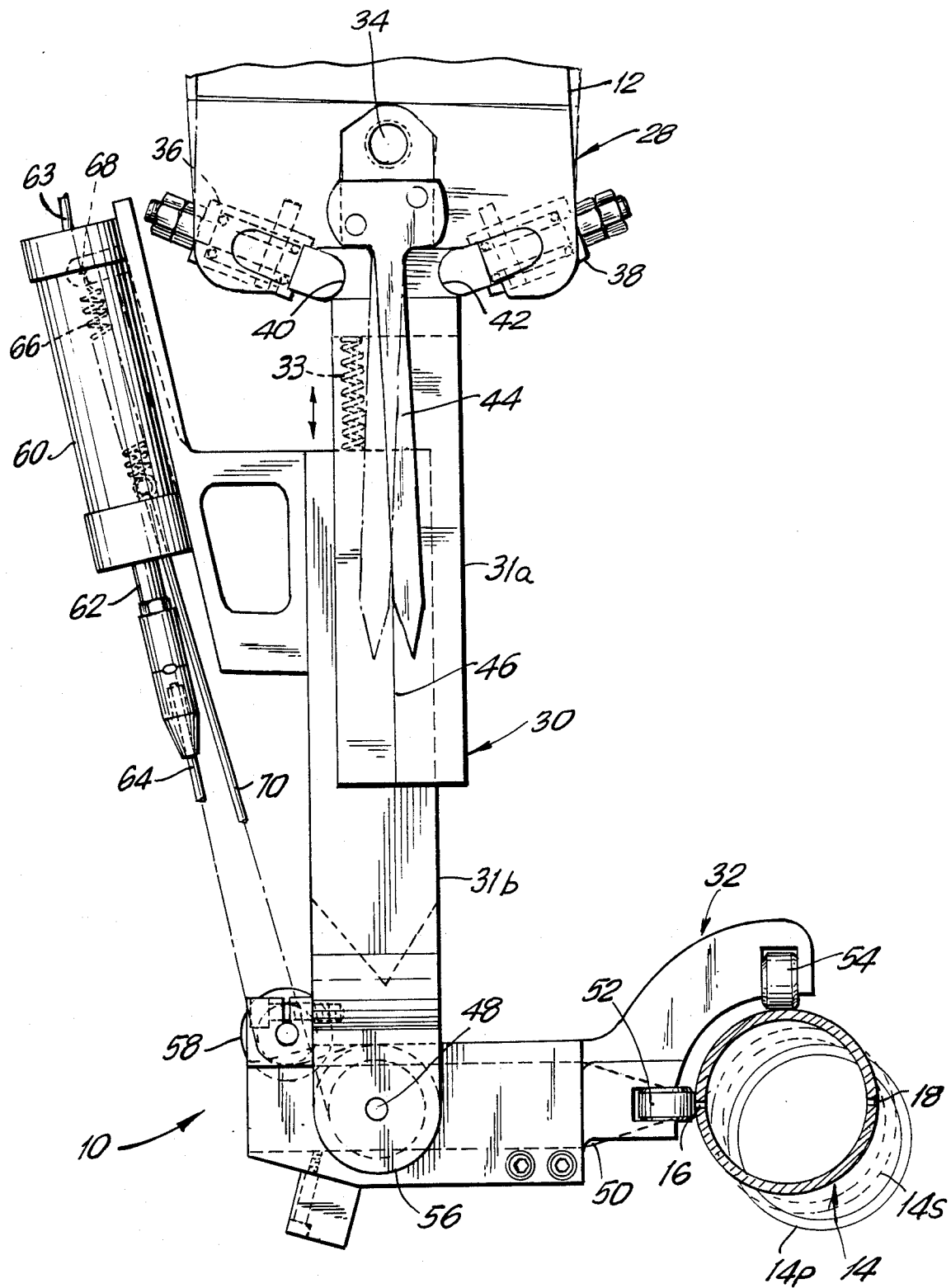
FIG. 2 is an elevational view of the end effector in a first operative position relative to a tubular workpiece.
Figure 3:
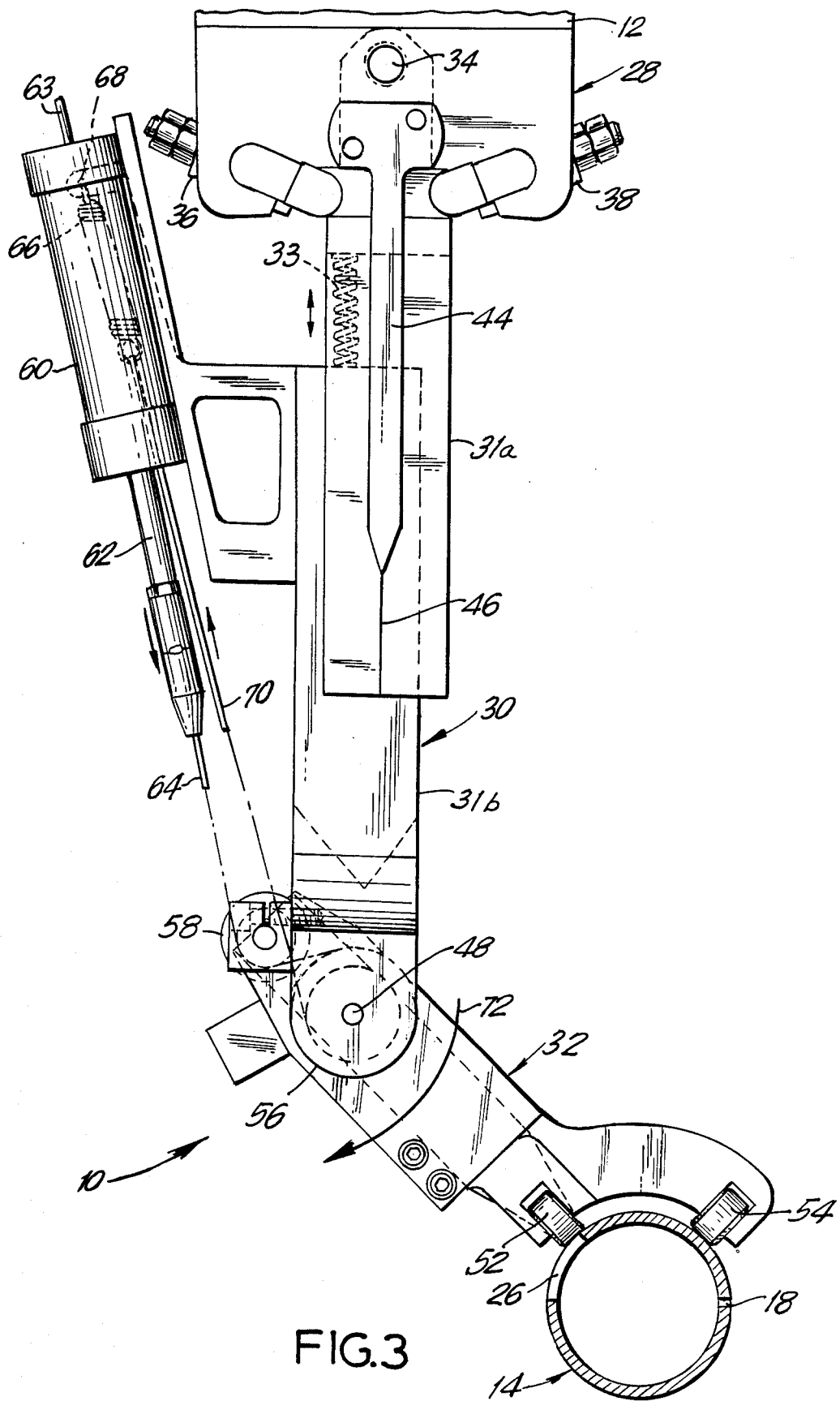
FIG. 3 is an elevational view of the end effector in a second operational position relative to a tubular workpiece.

The end effector of the subject invention is identified generally by the numeral 10 in FIGS. 1–3. As shown most clearly in FIG. 1, the end effector 10 is adapted for mounting to a robotic device 12. The end effector 10 and the robotic device 12 are particularly well suited for performing machining operations on a previously bent pipe 14. The pipe 14 illustrated in FIG. 1 is adapted for a vehicular exhaust system, and will define the outer pipe of an air gap pipe assembly comprising concentric inner and outer bent pipes.

The end effector 10 is operative to create a longitudinal cut 16 along the length of the bent pipe 14. A second end effector (not shown) of similar or identical construction mounted to a second robotic device (not shown) will place a second londitudinal cut 18 in the opposite side of the bent pipe 14. An apparatus and process employing two such robotic devices in this environment is shown in U.S. Pat. No. 4,656,713. As a result of the longitudinal cuts 16 and 18, the bent pipe 14 will effectively define two bent longitudinal halves 20 and 22 which can be completely separated from one another to enable the bent inner pipe of the air gap assembly to be placed therebetween. The end effectors 10 may further be employed to cut windows 24 and 26 in the bent pipe 14. The windows 24 and 26 may be required to enable the bent pipe 14 to pass in closer proximity to an adjacent structural component on a vehicle, or to enable the controlled dissipation of heat from carefully selected locations along the exhaust system or to provide for mounting of brackets or probes to the inner pipe. Accordingly, the size and shape of the windows 24 and 26 may vary considerably from one exhaust system to the next.

The location of the longitudinal cuts 16 and 18 and the windows 24 and 26 must be made with considerable precision. For example, off-center longitudinal cuts 16 and 18 may make it difficult or impossible to position the inner pipe (not shown) between the longitudinal halves 20 and 22 of the bent pipe 14. Furthermore, off center cuts 16 and 18 may make subsequent automatic rewelding of the halves 20 and 22 difficult to carry out. Similarly, imprecise locations of the windows 24 and 26 may make it difficult for the pipe 14 to be properly positioned relative to other structural components of the vehicle. Despite this need for considerable precision, metallurgical characteristics may cause different pipes 14 to react differently to the forces exerted thereon by the bending apparatus. In particular, one pipe 14 may bend more than required in response to bending moments resulting from the momentum of the pipe 14 moving under the action of the bender. Conversely, other pipes 14 may exhibit a spring-back when the bending apparatus releases its grip. As a result, each bent pipe 14 may vary significantly from its specified configuration. As noted above, and as explained in greater detail herein, the end effector 10 is operative to place the longitudinal cuts 16 and 18 and windows 24 and 26 accurately on the pipe 14 even though the pipe 14 may vary from its specified configuration.

The end effector 10 comprises a mounting base 28 which is securely connectable to the robotic device 12. A connecting arm 30 is pivotably mounted to the base 28 for controlled pivoting movement relative thereto toward and away from the pipe 14. The connecting arm 30 comprises a mounting portion 31a and an intermediate portion 31b which is in sliding or telescoping mounted relationship with the mounting portion 31a and is biased by spring means 33 away from the base 28. The biased or spring loaded connection between the mounting portion 31a and the intermediate portion 31b allows the end effector 10 to yield in response to variations in the size and location of the pipe 14, and particularly when the end effector 10 approaches its fully extended condition as explained herein. A forearm 32 is pivotally mounted to the intermediate arm 31, and is operative to follow the actual shape of the pipe 14 as explained herein. The movement of the robotic device 12 and certain movements of forearm 32 are controlled by a preprogrammed control unit 33.

With reference to FIG. 2, the connecting arm 30 is pivotally connected to the base 28 at pivot pin 34. Thus, the connecting arm 30 may undergo a controlled pivotal rotation relative to the base 28 and about the pivot pin 34. The range of pivotable movement of the connecting arm 30 relative to the mounting base 28 is selected such that the maximum movement of the connecting arm 30 most distant from the pivot pin 34 equals or exceeds the range of variations likely in pipe 14. The base 28 further includes centering spring assemblies 36 and 38 securely connected thereto and operative to urge the connecting arm 30 into a selected neutral position with respect to its range of pivotal movement about the pivot pin 34. More particularly, the centering spring assemblies 36 and 38 are operative to exert forces on the connecting arm 30 at locations 40 and 42 respectively at any time when the connecting arm 30 is displaced from the neutral position. Thus, as illustrated in FIG. 2, forces which cause a clockwise rotation of the connecting arm 30 about pivot pin 34 will cause the centering spring assembly 36 to retract. However, upon a release of the forces which cause the clockwise rotation of the connecting arm 30 around pivot pin 34, the centering spring assembly 36 will exert forces upon the connecting arm 30 at location 40, and will urge the connecting arm 30 back into its neutral position. A similar centering effect will be achieved by spring assembly 38 in response to forces causing a counterclockwise rotation of the connecting arm 30 about the pivot pin 34.

The base 28 further comprises an indicator arrow 44 securely connected thereto. The connecting arm 30 includes a center indicator line 46 inscribed thereon. A counterclockwise or clockwise rotation of the connecting arm 30 about the pivot pin 34 will cause the indicator arrow 44 to move off the indicator line 46. However, the centering spring assemblies 36 and 38 will cause the indicator arrow 44 to realign with the indicator line 46, thereby providing a visual check for the operator of the robotic device 12 and the end effector 10.

The forearm 32 is pivotally mounted to the intermediate portion 31b of connecting arm 30 at pivot pin 48. The forearm 32 includes a plasma arc cutting apparatus 50 mounted thereto for cutting through the bent pipe 14. The end of the forearm 32 opposite the pivot pin 48 comprises a pair of follower rollers 52 and 54 which are orthogonally disposed relative to one another and are operative to roll along the exterior of the bent pipe 14. The plasma arc cutter 50 and the follower roller 52 are disposed relative to one another to ensure that the plasma arc cutter 50 is optimally spaced from the bent pipe 14 when the follower roller 52 is positioned in contact with the pipe 14.

Drive pulley 56 is mounted to the pivot pin 48 such that the drive pulley 56 rotates with the forearm 32. A second substantially identical drive pulley (not shown) is mounted to the pivot pin 48 on the opposite side of the forearm 32. The end effector 10 further comprises a guide pulley 58 which is rotatably mounted to the intermediate portion 31b of connecting arm 30 at a location spaced from the pivot pin 48.

The end effector 10 further comprises a cylinder 60 rigidly mounted to the intermediate portion 31b of the connecting arm 30 at a location thereon spaced from the forearm 32. A piston 62 is slidably mounted in the cylinder 60 and is operative to move relative to the cylinder 60 in response to pneumatic or hydraulic fluid directed through tube 63. The flow of fluid through tube 63 is controlled by the control unit 33 shown schematically in FIG. 1. A cable 64 extends from the piston 62. The cable 64 extends around one side of the guide pulley 58 and is fixedly connected to a peripheral location on the drive pulley 56. The withdrawal of the piston 62 into the cylinder 60 under the action of pneumatic or hydraulic forces will create a pulling force on the cable 64 relative to the forearm 32. In particular, the forces exerted on the cable 64 by the withdrawal of the piston 62 into the cylinder 60 will act on drive pulley 56 and will rotate the forearm 32 in a counterclockwise direction relative to the view depicted in FIGS. 2 and 3.

A coil spring 66 has one end mounted at location 68 adjacent to the cylinder 60. A cable 70 extends from the spring 66 directly to the second drive pulley (not shown) which is mounted opposite drive pulley 56. The spring 66 acting through the cable 70 will exert a pulling force upon the second drive pulley and the forearm 32 to urge the forearm 32 in a clockwise direction as illustrated on FIGS. 2 and 3. Thus, the pulling force of the spring 66 will work in opposition to the pulling force of the piston 62. More particularly, the spring 66 acting through the cable 70 will urge the forearm 32 into contact with the bent pipe 14.

In operation, the robotic device will move the end effector 10 along the length of the bent pipe 14 and will at least partially position the end effector 10 for certain angular orientations of cuts to be made along the pipe 14. The flow of pneumatic or hydraulic fluid to the cylinder 60 through tube 63 will be controlled by control unit 33 in accordance with the position of the end effector 10 along the pipe 14. As a result of this controlled flow of pneumatic or hydraulic fluid to the cylinder 60, the piston 62 will slide relative thereto. In particular, the controlled withdrawal of the piston 62 into the cylinder 60 will exert a pulling force on cable 64 and cause the forearm 32 to rotate counterclockwise as shown in FIGS. 2 and 3 and generally away from the pipe 14. Conversely, the controlled extension of the piston 62 from the cylinder 60 will release the pulling force on the cable 64. The pulling forces exerted by the spring 66, however, will cause the forearm 32 to rotate in a clockwise direction as shown in FIGS. 2 and 3, thereby taking up the slack that would otherwise exist in the cable 64. This clockwise rotation of the forearm 32 caused by the extension of piston 62 from the cylinder 60 and the simultaneous pulling force of spring 66 is illustrated most clearly in FIG. 3. Thus, the controlled flow of pneumatic fluid to the cylinder 60 controls the programmed movement and alignment of the plasma arc cutter 50 relative to the pipe 14.

As noted above, the precise position of the pipe 14 may vary from the specified position. With reference to FIG. 2, the specified position of pipe 14 is shown in broken lines and is identified by the numeral 14s. Also as noted above, the robotic device 12 and the cylinder/piston assembly 60, 62 are programmed by the control unit 33 to effectively exert a preload against a pipe 14 in the specified location 14s. This effective preloaded programming may be operative to direct the plasma arc cutter 50 and the adjacent parts of end effector 10 to a programmed location 14p of the pipe 14, which corresponds to a maximum range of variation anticipated and/or acceptable for the pipe 14. It will be appreciated that in many situations the range of variations of pipe 14 will be less than the ranges illustratively depicted in FIG. 2 for purposes of this explanation.

With reference to FIG. 2, the pipe 14 is actually located above the specified location 14s and is spaced closer to the end effector 10 than specified at location 14s. The end effector 10 compensates for this imprecise actual location of pipe 14 in two distinct ways. First, the spring assembly 36 will yield to permit the connecting arm 30 to rotate clockwise about the pivot pin 34 to compensate for the pipe 14 actually being closer to the end effector 10 than the specified location 14s. However, the spring assembly 36 will continue to function by urging the connecting arm 30 in a counterclockwise direction to ensure that the follower roller 52 remains in contact with the pipe 14. Second, the spring 66 will yield to permit the forearm 32 to rotate counterclockwise to follow the actual position of pipe 14 above the specified position 14s. The spring 66 will continue to function by urging the forearm 32 in a clockwise rotational direction to ensure that the follower roller 54 maintains contact with the pipe 14. As the robotic device 12 moves longitudinally along the pipe 14, the magnitude and the direction of any imprecision may vary. However, the spring assembly 36 and the spring 66 will continue to exert appropriate rotational forces on the connecting arm 30 and the forearm 32 to ensure that the follower rollers 52 and 54 remain in contact with the pipe 14.

FIG. 3 depicts the end effector 10 cutting the window 26 in the pipe 14. To achieve the circumferential cuts associated with window 26, the alignment of the forearm 32 must be varied. This is achieved by appropriate application of pneumatic or hydraulic pressure to the cylinder 60 to cause the piston 62 to extend therefrom. The spring 66 and the cable 70 compensate for the extension of piston 62 by pulling on the second pulley and rotating the forearm 32 in a clockwise direction as shown by arrow 72 in FIG. 3. The spring assembly 36 and the spring 66 will continue to function as described above to permit the end effector 10 to follow the actual position of the pipe 14, thereby compensating for any deviations of the pipe 14 from its specified location. Furthermore, the intermediate portion 31b may slide relative to mounting portion 31a either against or with the force of the spring therebetween to compensate for the position of the pipe 14 as the end effector 10 moves beyond the FIG. 3 alignment and toward its fully extended condition. The piston 62 can be withdrawn into the cylinder 60 to achieve the relative position shown in FIG. 2 and to enable the end effector 10 to continue the longitudinal cut 16 in pipe 14. This withdrawal of the piston 62 into the cylinder 60 will result in the stretching of spring 66.

The angular position of the forearm 32 depicted in FIG. 3 is approximately 45° different from the angular position shown in FIG. 2. The forearm 32 may rotate substantially more than this illustrated 45° rotation. More particularly, the forearm 32 may rotate substantially more than 90° clockwise from its FIG. 2 orientation. In these situations the spring assembly 38 and the spring 33 between the connecting and intermediate portions 32a and b of the connecting arm 30 will be operative to compensate for variations in the actual position of the pipe 14 from its specified position. The spring assembly 38 will also be operative in all angular positions of the forearm 32 to control and dampen any rotation of connecting arm 30 about pivot pin 34 that may be caused by momentum of the various moving parts or by inadvertent contact.

The indicator 44 as shown in FIG. 2 is angularly rotated counterclockwise from the indicator line 46. This displacement of the indicator 44 from the indicator line 46 shows the operator of the robotic device 12 that pipe 14 is of imperfect alignment at that particular longitudinal location. In other cutting alignments the indicator may be displaced clockwise as shown in broken lines. Patterns can be detected from the position of indicator 44 relative to the indicator line 46, and appropriate adjustments to the bending apparatus may be required. The indicator 44 may be set to coincide with the indicator line 46 between adjacent cutting operations. Thus, the operator of the robotic device 12 can periodically check to ensure that the connecting arm 30 returns to its neutral position between adjacent cuts. Alternatively, the indicator 44 can be positioned to coincide with the indicator line 46 during a cutting of the pipe 14 at the specified location 14s. The relative position of the indicator 44 to the indicator line 46 can be employed as an overall check on the performance of bending equipment as applied to a particular shipment of pipes 14.

In summary, an end effector for a robotic device is provided. The end effector comprises a connecting arm that is pivotable relative to the robotic device. Bias means in the form of spring assemblies urge the connecting arm toward a neutral position with respect to the robotic device. A forearm is pivotally mounted to the connecting arm. A spring means is operatively connected to the connecting arm and the forearm to urge the forearm toward a workpiece. A power means is also operatively connected to the forearm for selectively rotating the forearm relative to the connecting arm and in opposition to the forces exerted by the spring means. The forearm further comprises rollers or other means for following the actual configuration of the workpiece, and a machining means, such as a plasma arc cutter, for performing a selected machining operation on the workpiece. The biasing means mounted to the connecting arm and the spring means connected to the forearm ensure that the end effector will follow the actual shape of the workpiece despite variations from the specified configuration of the workpiece.

While the invention has been described with respect to certain preferred embodiments, it is apparent that various changes can be made without departing from the scope of the invention ad by the appended claims.

What is claimed is:

1. An end effector for use with a robotic device and a machining tool for positioning said machining tool at specified locations on a workpiece, said end effector comprising:
    a connecting arm pivotably mounted to the robotic device for rotation generally toward and away from the workpiece, said connecting arm comprising a mounting portion mounted to said robotic device and an intermediate portion slidably connected to said mounting portion for alternate extension and retraction therefrom;
    first biasing means for urging said intermediate portion of said connecting arm into a fully extended position relative to the mounting portion;
    second biasing means mounted intermediate said robotic device and said connecting arm for urging said connecting arm through its pivotable motion toward a predetermined alignment relative to said robotic device;
    a forearm pivotably mounted to said connecting arm at a location thereon spaced from the pivotable connection of said connecting arm to said robotic device;
    forearm spring means for urging said forearm in a first rotational direction relative to said connecting arm;
    power means for selectively rotating said forearm relative to said connecting arm in a rotational direction opposite to the forearm spring means.

2. An end effector as in claim 1 further comprising follower means at at least one location on said forearm spaced from said pivotable connection of said forearm to said connecting arm, said follower means being operative to maintain a selected orientation between the machine tool and the workpiece.

3. An end effector as in claim 1 wherein said forearm spring means comprises a coil spring, one end of said coil spring being fixedly connected to a location on said end effector spaced from said forearm, the opposed end of said spring being fixedly connected to a location on said forearm spaced from the pivotable connection of said forearm to said connecting arm such that said spring is operative to urge said forearm through rotational movement relative to said connecting arm.

4. An end effector as in claim 1 wherein said power means comprises a cylinder fixedly mounted to said end effector at a location spaced from said forearm, a piston slidably mounted in said cylinder, a cable extending from said piston to a location on said forearm spaced from the pivotable connection of said forearm to said connecting arm, such that selected movement of said piston relative to said cylinder causes the cable to exert forces on said forearm and to rotate said forearm relative to said connecting arm.

5. An end effector as in claim 4 further comprising a pair of spring assemblies mounted on opposite sides of said connecting arm and intermediate said connecting arm and said robotic device, each said spring assembly being operative to urge said connecting arm toward the other of said spring assemblies.

6. An end effector as in claim 1 further comprising indicator means for indicating the relative alignment of said connecting arm to said robotic device.

7. An end effector as in claim 1 further comprising a base mountable to said robotic device, said connecting arm being pivotally mounted to said base for pivotable movement relative to said robotic device.

8. An end effector as in claim 1 further comprising a plasma arc cutter mounted to said forearm for performing cutting operation on a workpiece.

9. An end effector for a robotic device, said end effector being operative to perform a selected machining operation on a workpiece, said end effector comprising:
    a base mountable to the robotic device;
    a connecting arm pivotally connected to the base;
    biasing means for urging said connecting arm into a specified location relative to said base;
    a forearm pivotally connected to said connecting arm at a location thereon spaced from the base, said forearm comprising follower means for following the actual configuration of the workpiece;

machining means mounted to said forearm for performing a selected machining operation on the workpiece;

forearm coil spring having opposed first and second ends, the first end being connected to said connecting arm, the second end of said forearm coil spring being connected to a cable extending to a selected location on said forearm for urging said forearm through pivotal movement about said connecting arm; and a piston and cylinder assembly for selectively pivoting said forearm relative to said connecting arm and in a direction opposite to the pivoting movement urged by said forearm spring means, whereby the biasing means and the forearm coil spring permit the end effector to follow the actual configuration of the workpiece.

10. An end effector as in claim 9 wherein the machining tool comprises a cutting tool.

11. An end effector as in claim 10 wherein the cutting tool is a plasma arc cutting device, said plasma arc cutting device being fixedly mounted to said forearm.

12. An end effector as in claim 9 wherein the follower means comprise a pair of spaced apart rollers aligned relative to one another to roll along at least one surface of said workpiece.

13. An end effector as in claim 9 wherein said forearm comprises a pulley fixedly and nonrotationally mounted thereto and concentric with the pivotable connection of said forearm to said connecting arm, said piston and the cable of said coil spring being fixedly connected to said pulley.

14. An end effecting as in claim 9 wherein said cylinder is pneumatically operable, and wherein said end effector further comprises means for selectively directing pneumatic fluid to said cylinder.

15. An end effector as in claim 9 wherein said connecting arm comprises a mounting portion mounted to said robotic device and an intermediate portion slidably connected to said mounting portion for alternate extension and retraction therefrom, said intermediate portion being the portion of said connecting arm to which said forearm is connected.

16. An end effector as in claim 15 further comprising biasing means for urging said intermediate portion of said connecting arm into the extended position.

17. An end effector for use with a robotic device and a machining tool for positioning said machining tool at specified locations on a workpiece, said end effector comprising:

a connecting arm pivotably mounted to the robotic device for rotation generally toward and away from the workpiece;

biasing means mounted intermediate said robotic device and said connecting arm for urging said connecting arm through its pivotable motion toward a predetermined alignment relative to said robotic device;

a forearm pivotably mounted to said connecting arm at a location thereon spaced from the pivotable connection of said connecting arm to said robotic device;

forearm spring means for urging said forearm in a first rotational direction relative to said connecting arm, said forearm spring means comprising a coil spring having one end fixedly connected to a location on said end effector spaced from said forearm, the opposed end of said spring being fixedly connected to a location on said forearm spaced from the pivotable connection of said forearm to said connecting arm such that said spring is operative to urge said forearm through rotational movement relative to said connecting arm; and power means for selectively rotating said forearm relative to said connecting arm in a rotational direction opposite to the forearm spring means.

18. An end effector for use with a robotic device and a machining tool for positioning said machining tool at specified locations on a workpiece, said end effector comprising:

a connecting arm pivotably mounted to the robotic device for rotation generally toward and away from the workpiece;

biasing means mounted intermediate said robotic device and said connecting arm for urging said connecting arm through its pivotable motion toward a predetermined alignment relative to said robotic device;

a forearm pivotably mounted to said connecting arm at a location thereon spaced from the pivotable connection of said connecting arm to said robotic device;

forearm spring means for urging said forearm in a first rotational direction relative to said connecting arm;

power means for selectively rotating said forearm relative to said connecting arm in a rotational direction opposite to the forearm spring means, said power means comprising a cylinder fixedly mounted to said end effector at a location spaced from said forearm, a piston slidably mounted in said cylinder, a cable extending from said piston to a location on said forearm spaced from the pivotable connection of said forearm to said connecting arm, such that selected movement of said piston relative to said cylinder causes the cable to exert forces on said forearm and to rotate said forearm relative to said connecting arm; and a pair of spring assemblies mounted on opposite sides of said connecting arm and intermediate said connecting arm and said robotic device, each said spring assembly being operative to urge said connecting arm toward the other of said spring assemblies.

* * * * *

UNITED STATES PATENT AND TRADEMARK OFFICE
CERTIFICATE OF CORRECTION

PATENT NO. : 4,831,231
DATED : May 16, 1989
INVENTOR(S) : Camille Peele

It is certified that error appears in the above—identified patent and that said Letters Patent is hereby corrected as shown below:

On the title page:

Please note that the name of the inventor on the above identified patent is incorrectly printed as "Pelle", when in fact the correct spelling of the inventor's surname is --Peele--.

Signed and Sealed this

Third Day of April, 1990

Attest:

HARRY F. MANBECK, JR.

*Attesting Officer*     *Commissioner of Patents and Trademarks*